3,339,195
LIGHT RESPONSIVE CIRCUIT FOR INHIBITING
FALSE SIGNALS IN ARTICLE DELIVERY AND
INSPECTION DEVICES
Ellsworth M. Murley, Jr., Toledo, Ohio, assignor to
Owens-Illinois, Inc., a corporation of Ohio
Filed Dec. 6, 1963, Ser. No. 328,615
9 Claims. (Cl. 340—259)

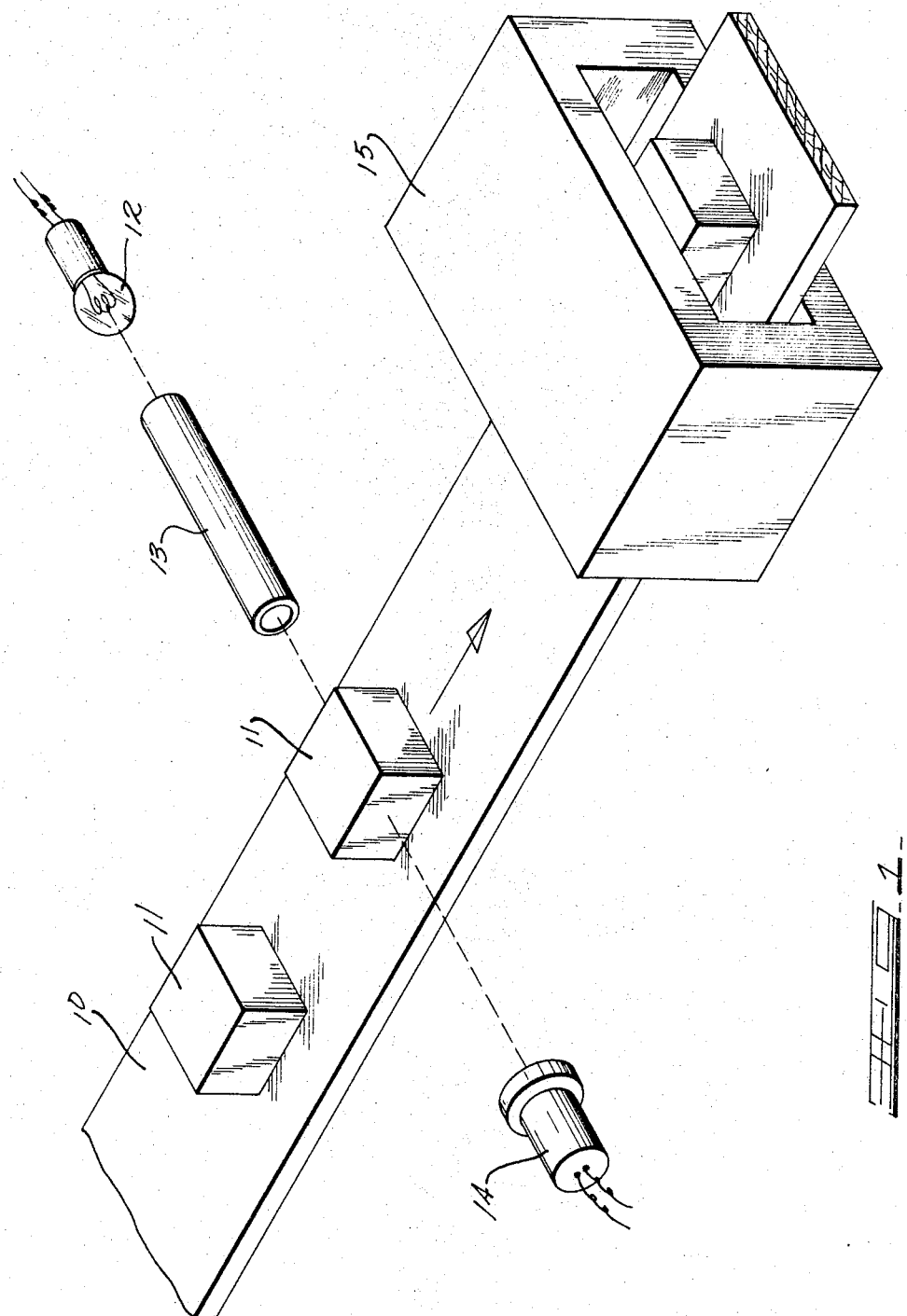
INVENTOR.
ELLSWORTH M. MURLEY JR.
BY
ATTORNEYS

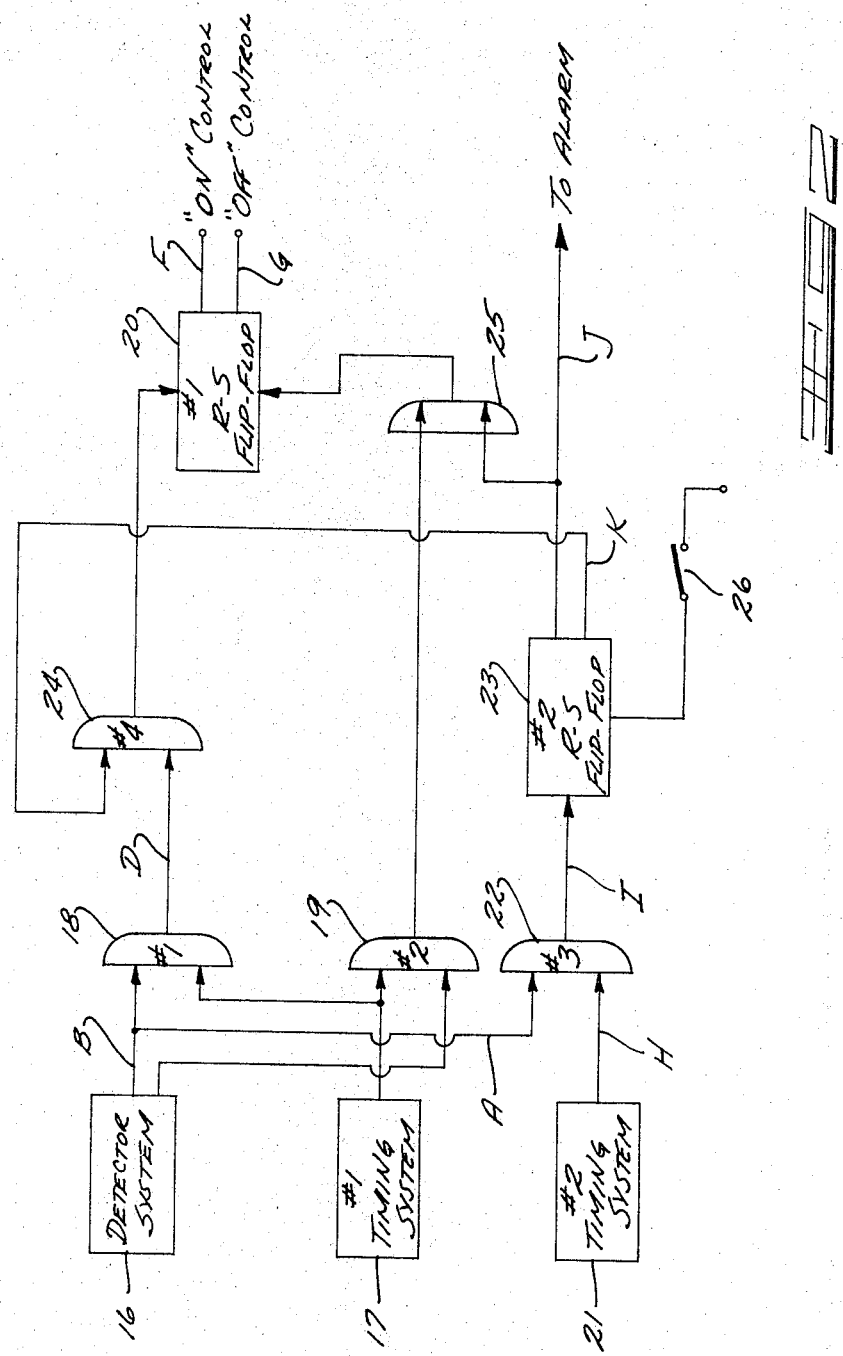

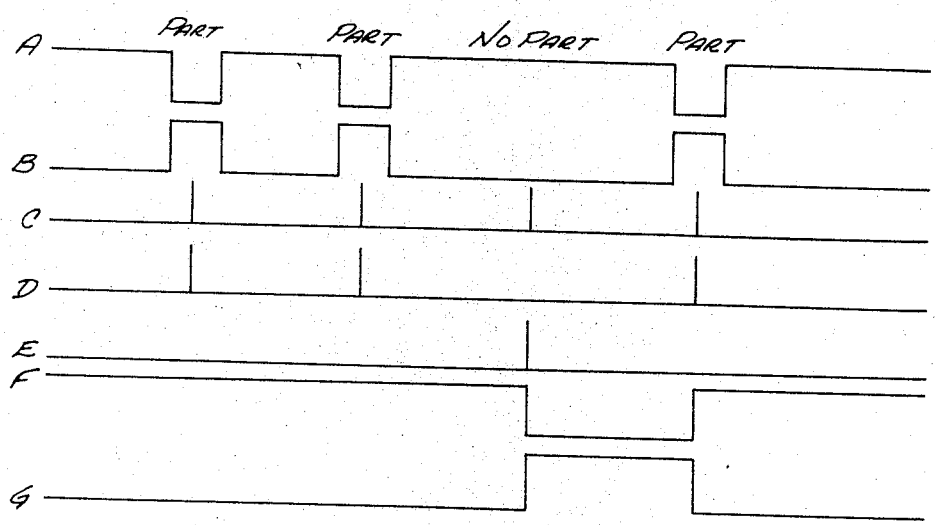
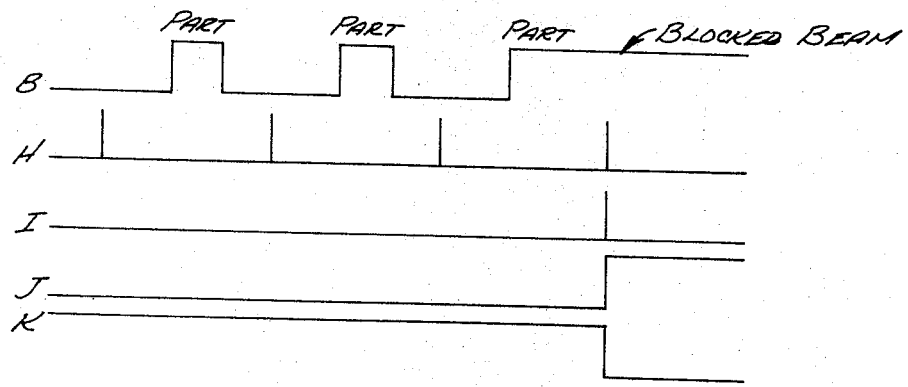
INVENTOR.
ELLSWORTH M. MURLEY JR.
BY
ATTORNEYS United States Patent Office 3,339,195
Patented Aug. 29, 1967

ABSTRACT OF THE DISCLOSURE

The apparatus described herein comprises a conveyor which moves articles to an assembly machine or an inspecting device. A source of light is focused in a beam transversely of the path of the articles to a photocell. Timing means produces a plurality of timing pulses at the times when an article should be present. Apparatus is provided which operates in synchronism with the first-mentioned timing means to produce second timing pulses spaced in time from the first set of timing pulses during which an article should not be present. Finally, means are provided which are responsive to the simultaneous occurrence of a second timing pulse and the de-energization of the photocell by failure of the light beam to pass thereto when an article is present so as to produce a signal.

Background of the invention

This invention relates to article handling and inspection devices and particularly to such devices which utilize an optical system for determining the presence of an article.

In the handling of articles and delivery of articles to assembly points or inspection points, it is necessary to determine whether or not an article is in proper position for the assembly or inspection in order to prevent either wastage of parts in assembly or false reject signals. A conventional method of determining the presence of an article has been to direct a beam in the path of the article and cause the article to interrupt the passage of the beam to light sensitive means. Simultaneously, timing pulses are produced in synchronism with the assembly or inspecting machine and if the interruption of the beam and the timing pulse occur simultaneously, then the article is in proper position for assembly or inspection. However, in the event that the optics fail, such as failure of the filament in the light bulb, or the light beam is blocked by dirt or foreign matter, a false signal is produced, indicating the presence of an article when in fact it is not present.

It is an object of this invention to provide a method and apparatus for inhibiting such false signals in such article handling and inspecting systems.

Summary

Basically, the invention comprises producing a second set of timing pulses in spaced time relation to the first set of timing pulses at intervals when an article should not be present and creating a warning signal if the passage of light to the light sensitive means occurs simultaneously with one of said second timing pulses. This warning signal actuates an alarm or interrupts the assembly device, inspection device or the device for delivering the articles to the assembly or inspection device.

Description of the drawings

In the drawings:

FIG. 1 is a fragmentary perspective view of a typical apparatus embodying the invention.

FIG. 2 is a schematic wiring diagram of the circuit.
FIG. 3 is a wave diagram of a portion of the circuit.
FIG. 4 is a wave diagram of another portion of the circuit.

Description

Referring to FIG. 1, a typical system embodying the invention comprises a conveyor 10 for moving articles 11 to an assembly machine or an inspecting device 15. In order to determine whether or not a part 11 is being delivered in proper timed relationship to the operation of the assembly machine or inspecting a device, a source of light 12 is focused into a beam by a lens system 13 and directed transversely in the path of the articles to a photocell 14. Through gearing with the assembly or inspecting device, a plurality of timing pulses are produced, as presently described, and if the pulse produced by interruption of the passage of the light beam to the photocell 14 by the presence of an article 11 occurs simultaneously with one of the timing pulses, then the article is in proper position for subsequent operations on the assembly machine or inspecting device.

The electronic diagram for the system is shown in FIG. 2 and comprises a detector system 16 which takes the signal from the photocell 14 and amplifies it to produce output wave forms A and B (FIG. 3). This may comprise an amplifier and Schmitt trigger. It can be seen that these wave forms correspond to the presence of parts on the conveyor. A first timing system 17 produces a plurality of pulses in timed relation to the operation of the device 15. These pulses are shown in wave form C in FIG. 3. The wave forms A, B and C are fed respectively to a first AND gate 18 and a second AND gate 19. If the signal produced by presence of a part and the timing pulse occur substantially simultaneously, a R-S flip-flop 20 is set to energize an ON control to continue the operation of the device 15 and the conveyor 10. If an article is absent, then the timing pulse passes to the flip-flop 20 to change the state of the flip-flop and produce an output wave form G energizing an OFF control and stopping the operation of the device 15.

If the passage of the light beam from the source 12 to the photocell 14 is interrupted due to failure of the light source or lens system or the presence of dirt or other foreign matter, then, unless some control is provided, the system will operate to indicate the presence of an article.

In order to prevent such a false operation, according to the invention, a second timing system 21 is provided, producing a second set of timing pulses in spaced time relation to the first set of timing pulses from the first timing system 17 at times when an article should not be present in the path of the beam. The wave form of these timing pulses is shown at H in FIG. 4. The timing pulses from timing system 21 are fed to a third AND gate 22. The negative pulse B of the detector system 16 is also fed to the third AND gate 22. The negative pulse B inhibits the timing pulse from timing system 21 from passing through AND gate 22 when the passage of light to the cell is unobstructed.

The output of third AND gate 22 is fed to a second R-S flip-flop 23, the output of which in turn is fed to a fourth AND gate 24 interposed between AND gate 18 and flip-flop 20. The output of the second flip-flop 23 is also fed to an OR gate 25.

The positive output of the flip-flop 23 is fed to AND gate 24 and the negative output is fed to the OR gate 25. This sets the AND gate 24 and the OR gate 25 so that the system operates as a normal control system so long as the optical path is not blocked by failure of the light source or the presence of foreign matter.

If the optical path is blocked as by failure of the light source or the presence of a foreign particle, the wave form A goes positive which allows the pulse from the timing system 21 to be transmitted through AND gate 22. This causes flip-flop 23 to change state, the positive-going signal being fed to flip-flop 20 through the OR gate 25 to set the control system to OFF position if it is not already off. At the same time, the negative-going output is fed to the AND gate 24, inhibiting the gate 24. This locks the control system off until it is manually reset. The positive signal from flip-flop 23 also produces a warning or alarm signal, wave form K. After the optical path has been cleared, a reset button 26 is closed to return the system to its normal state.

The term "light" and "light beam" as used herein is intended to cover any form of radiant energy which will be interrupted or diminished by the presence of an article between the source and the sensitive means.

It can thus be seen that there has been provided a method and apparatus for inhibiting false signals in delivery and inspection devices wherein a light beam and timing pulse are used to indicate the presence of an article in proper timed relation to the operation of the devices.

I claim:
1. In an apparatus for determining whether articles are in proper position at a predetermined time, which apparatus comprises a source of light for directing a light beam, light sensitive means in the path of the beam, the presence of an article interrupting the passage of said light beam to said light sensitive means and timing means for producing timing pulses at the times when an article should be present, the improvement comprising
    means operated in synchronism with said first-mentioned timing means for producing second timing pulses spaced in time from said first set of timing pulses during which an article should not be present,
    and means responsive to the simultaneous occurrence of a second timing pulse and the de-energization of the light sensitive means by failure of the light beam to pass thereto to produce a signal.
2. In an apparatus for determining whether articles are being delivered to an assembly or inspection device in proper timed relation, which apparatus comprises means for delivering the articles, a source of light for directing a light beam in the path of the articles, light sensitive means in the path of the beam, and timing means for producing timing pulses when the articles should be present in a predetermined position as they are delivered to said device, the improvement comprising
    means operated in synchronism with said first-mentioned means for producing a second set of timing pulses spaced in time from said first set of timing pulses during which an article should not be present,
    and means responsive to the simultaneous occurrence of a second timing pulse and the de-energization of the light sensitive means by failure of the light beam to pass thereto to produce a signal.
3. The combination set forth in claim 2 including means responsive to said last-mentioned signal to de-activate said device.
4. The combination set forth in claim 2 including means responsive to said last-mentioned signal to stop said means for delivering said articles.
5. The combination comprising
    a source of light for directing a light beam,
    light sensitive means positioned in the path of the light beam,
    means for successively moving articles through said light beam to successively interrupt the passage of light to said light sensitive means,
    means operated in synchronism with said last-mentioned means for producing first timing pulses,
    means responsive to the absence of an article during the first timing pulse to produce a signal,
    means for producing a second set of timing pulses in timed spaced relation with said first set of timing pulses corresponding to a time when an article should not be present to interrupt a light beam,
    and means responsive to the absence of energization of said light sensitive means during a said second timing pulse to produce a signal.
6. The combination comprising
    a source of light for directing a light beam,
    light sensitive means positioned in the path of the light beam,
    means for successively moving articles through said light beam to successively interrupt the passage of light to said light sensitive means,
    a device to which said articles are delivered by said last-mentioned means,
    means operated in synchronism with said device means for producing a first timing pulse when an article is being delivered in proper timed relation,
    means responsive to the absence of an article during the first timing pulse to produce a first signal,
    means responsive to said first signal to activate said device,
    means for producing second timing pulses at timed spaced relation with said first timing pulses,
    and means responsive to the absence of energization of said light sensitive means during a said second timing pulse to produce a second signal.
7. The combination set forth in claim 6 including means responsive to said second signal to de-activate said device.
8. The combination comprising
    a source of light for directing a light beam,
    light sensitive means in the path of said light beam,
    means for successively moving articles through said light beam to successively interrupt the passage of said light beam to said light sensitive means,
    detector means responsive to the interruption of the passage of light to said light sensitive means for producing sensing pulses,
    first timing means operated in synchronism with said article moving means for producing a plurality of timing pulses,
    a first AND gate,
    a second AND gate,
    means for directing the pulses from said detector means and said first timing means to said first and second AND gates,
    second timing means for producing a second set of pulses in spaced time relation to said first set of pulses corresponding to times when articles should not interrupt said light beam,
    a third AND gate,
    means for directing a pulse from said detector system to said third AND gate,
    means for directing the pulses from said second timing means to said third AND gate,
    a first flip-flop,
    a second flip-flop,
    an OR gate,
    means for directing the output of said third AND gate to said second flip-flop,
    means for directing the output of said second flip-flop to said OR gate,
    means for directing the output of said second AND gate to said OR gate,
    means for directing the output of said OR gate to said first flip-flop,
    means for directing the output of said first gate to a fourth AND gate,
    means for directing the output of said second flip-flop to said fourth AND gate,
    and means for directing the output of said fourth gate to said first flip-flop.

9. The combination comprising
a source of light for directing a light beam,
light sensitive means in the path of said light beam,
a device for operating on said articles,
means for successively moving articles through said light beam to successively interrupt the passage of said light beam to said light sensitive means and thereafter to said device,
detector means responsive to the interruption of the passage of light to said light sensitive means for producing sensing pulses,
first timing means operated in synchronism with said device for producing a plurality of timing pulses,
a first AND gate,
a second AND gate,
means for directing the pulses from said detector means and said first timing means to said first and second AND gates,
second timing means for producing a second set of pulses in spaced time relation to said first set of pulses corresponding to times when articles should not interrupt said light beam,
a third AND gate,
means for directing a pulse from said detector system to said third AND gate,
means for directing the pulses from said second timing means to said third AND gate,
a first flip-flop,
a second flip-flop,
an OR gate,
means for directing the output of said third AND gate to said second flip-flop,
means for directing the output of said flip-flop to said OR gate,
means for directing the output of said second AND gate to said OR gate,
means for directing the output of said OR gate to said first flip-flop,
means for directing the output of said first gate to a fourth AND gate,
means for directing the output of said second flip-flop to said fourth AND gate,
means for directing the output of said fourth gate to said first flip-flop,
and means controlled by said first flip-flop to activate and deactivate said device.

No references cited.

NEIL C. READ, *Primary Examiner.*

H. PITTS, *Assistant Examiner.*